US007013159B2

(12) United States Patent
Lee

(10) Patent No.: US 7,013,159 B2
(45) Date of Patent: Mar. 14, 2006

(54) POWER CONTROL METHOD FOR A MOBILE STATION

(75) Inventor: Jae-Wook Lee, Daegukwangyeok-shi (KR)

(73) Assignee: Samsung Electronics Co., Ltd., (KR)

( * ) Notice: Subject to any disclaimer, the term of this patent is extended or adjusted under 35 U.S.C. 154(b) by 626 days.

(21) Appl. No.: 09/886,878

(22) Filed: Jun. 21, 2001

(65) Prior Publication Data

US 2002/0094832 A1 Jul. 18, 2002

(30) Foreign Application Priority Data

Jan. 17, 2001 (KR) .............................. 2001-2535

(51) Int. Cl.
*H04B 7/00* (2006.01)

(52) U.S. Cl. .................. 455/522; 455/574; 455/435.1; 370/318

(58) Field of Classification Search ................ 455/522, 455/574, 435.1
See application file for complete search history.

(56) References Cited

U.S. PATENT DOCUMENTS

| 5,946,620 | A  | * | 8/1999 | Schultz et al. ........... 455/435.1 |
| 6,223,047 | B1 | * | 4/2001 | Ericsson ...................... 455/517 |
| 6,369,466 | B1 | * | 4/2002 | Murphy ....................... 307/125 |
| 6,535,752 | B1 | * | 3/2003 | Dent .......................... 455/574 |
| 6,591,113 | B1 | * | 7/2003 | Mortensen .................. 455/522 |
| 6,609,008 | B1 | * | 8/2003 | Whang et al. .............. 455/522 |

* cited by examiner

*Primary Examiner*—Edan Orgad
*Assistant Examiner*—Angelica M. Perez
(74) *Attorney, Agent, or Firm*—Dilworth & Barrese LLP

(57) ABSTRACT

A power control method for a mobile terminal is disclosed. At a power-off request of a mobile station user, the mobile station attempts to send a power-down registration request to a base station for as many times as set in a maximum attempt sequence. Upon failure to receive a response from the base station even after the attempts to send the power-down registration request for as many times as set in the maximum attempt sequence, the mobile station reattempts the power-down registration request operation for as many times as set in a predetermined retry number. Upon receipt of a response from the base station during the reattempts, the mobile station performs power-off of the mobile station. Further, the mobile station performs a call processing process upon receipt of an incoming call during the reattempts.

13 Claims, 3 Drawing Sheets

POWER CONTROL METHOD FOR A MOBILE STATION

PRIORITY

This application claims priority to an application entitled "Power-Off Control Method for a Mobile Station" filed in the Korean Industrial Property Office on Jan. 17, 2001 and assigned Ser. No. 2001-2535, the contents of which are hereby incorporated by reference.

BACKGROUND OF THE INVENTION

1. Field of the Invention

The present invention relates generally to a mobile communication system, and in particular, to a method for controlling power-off of a mobile station.

2. Description of the Related Art

Unlike the public switched telephone network (PSTN), a public land mobile network (PLMN) manages the connection between a mobile station (MS) and a base station (BS) in a radio environment.

A 3G ($3_{rd}$ Generation) IS-95 mobile communication system capable of transmitting not only voice but also high-speed data, can provide a high-quality voice service, a moving image service, and an Internet search service. In such a mobile communication system, a radio communication link existing between the MS and the BS is divided into a forward link transmitted from the BS to the MS and a reverse link transmitted from the MS to the BS. For an exchange of signaling data between the BS and the MS before setup of a voice call, a paging channel which is a forward common channel and an access channel which is a reverse common channel are used. When transmitting a message from the BS to the MS, the BS transmits the message over the paging channel and receives a response or ACK (acknowledge) from the MS over the access channel. To the contrary, when transmitting a message from the MS to the BS, the MS transmits the message over the access channel and receives a response from the BS over the paging channel. Therefore, there may exist a plurality of the paging channels and the access channels: the paging channels are distinguished by unique Walsh codes, while the access channels are distinguished by unique long codes.

In the IS-95A, IS-95B or J-STD0008 mobile communication system, when an MS user makes a power-off request using a power key, the MS attempts to send a power-down registration request to the BS as many times as a predetermined maximum attempt sequence (max_probe_sequence or max_attempt_sequence) using the access channel. Upon failure to receive a response to the power-down registration request from the BS, the MS continuously attempts to send the power-down registration request as many times as up to the predetermined maximum attempt sequence (max_probe_sequence or max_attempt_sequence) while increasing transmission power little by little. Upon receipt of a power-down registration confirm response from the BS in the process of sending the power-down registration request, the MS is powered off. However, upon failure to receive the response from the BS even after the attempts as many times as the maximum attempt sequence, the MS is automatically powered off. In this case, the BS does not recognize the power-off state of the automatically powered-off MS. In this state, upon receipt of a request for call setup to the powered-off MS from another MS, the BS attempts paging the powered-off MS through the paging channel. Undesirably, however, this gives an unnecessary load to the BS. Furthermore, compared with when the BS recognizes the power-off state of the MS, the call setup requesting MS's user should wait for a relatively longer time before receiving a voice mail service for the power-off state of the called MS.

SUMMARY OF THE INVENTION

It is, therefore, an object of the present invention to provide a method for efficiently controlling power-off of a mobile station.

It is another object of the present invention to provide a power-off control method for a mobile station, capable of reducing a base station load.

It is further another object of the present invention to provide a power-off control method for a mobile station, capable of increasing a success rate of power-down registration at the mobile station.

To achieve the above and other objects, there is provided a power control method for a mobile terminal in a mobile communication system. At a power-off request of a mobile station user, the mobile station attempts to send a power-down registration request to a base station as many times as a specified maximum attempt sequence. Upon failure to receive a response from the base station even after the attempts to send the power-down registration request as many times as the specified maximum attempt sequence, the mobile station reattempts the power-down registration request operation as many times as a predetermined retry number. Upon receipt of a response from the base station during the reattempts, the mobile station performs power-off of the mobile station.

Preferably, the mobile station waits for a predetermined time before until the mobile station reattempts to send the power-down registration request as many times as the maximum attempt sequence.

Further, the mobile station performs a call processing process upon receipt of an incoming call during the reattempts.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

An embodiment of the present invention is applied to a North American style digital mobile communication system, by way of example. The North American style system adopts IS-95, IS-634 and IS-41 standards. In particular, the present invention can also be applied to the 3G mobile communication system such as CDMA 2000 (Code Division Multiple Access 2000) and UMTS (Universal Mobile Telecommunication System) mobile communication systems, which can transmit not only the voice but also the high-speed data. The 3G mobile communication system provides the high-quality voice service, the moving image service, and the Internet search service.

Figure 1:
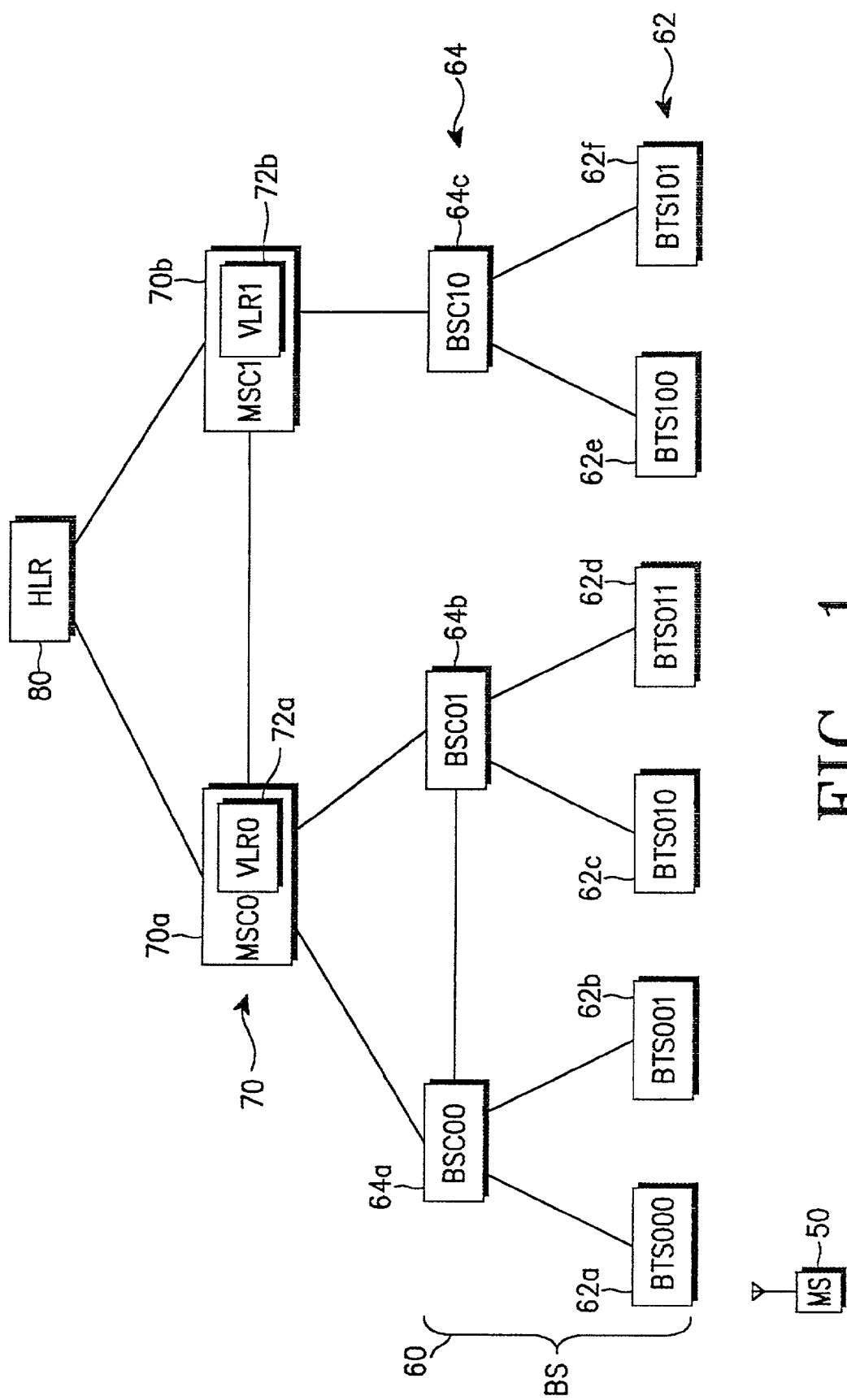
FIG. 1 is a diagram illustrating the configuration of a mobile communication system to which the present invention is applied by way of example.

FIG. 1 illustrates a mobile communication system to which an embodiment of the present invention is applied by way of example. Referring to FIG. 1, the mobile communication system includes HLR (Home Location Register) 80, MSC (Mobile Switching Center) 70a–70b, BSC (Base Station Controller) 64a–64c, BTS (Base station Transceiver Subsystem) 62a–62f, and MS (Mobile Station) 50. In one PLMN (Public Land Mobile Network), several HLRs perform subscriber management and call exchange in cooperation with their associated MSCs. As illustrated FIG. 1, one HLR 80 is connected to several MSCs 70 (e.g., 70a and 70b). One MSC 70 is connected to several BSCs 64: for example, MSC0 70a is connected to BSC00 64a and BSC01 64b. One BSC 64 is connected to several BTSs 62: for example, BSC00 64a is connected to BTS000 62a and BTS001 62b. Commonly, BSC 64 and BTS 62 constitute a BS (Base Station).

More specifically describing functions of the elements shown in FIG. 1, the MSC 70 controls the connection with the BSC 64, the PSTN (Public Switched Telephone Network) and other PLMNs, and the BSC 64 performs radio link control and a handoff. The BTS 62 forms a radio communication link to the MS 50, and performs radio resource management. The HLR 80 performs subscriber location registration and serves as a database for storing subscribers' information. VLRs (Visitor Location Registers) 72a and 72b are databases for temporarily storing information about the MS 50 existing in the cell area covered by the associated MSC (i.e., MSC0 70a and MSC1 70b). If the MS 50 moves to another cell area, the information stored in the associated VLR is also deleted.

In this mobile communication system, when a call is set up, the MS 50 and the BTS 62 assign a radio channel, and then assign a communication path between the BTS 62 and the BSC 64, between the BSC64 and the MSC 70 and between the MSC 70 and another PLMN or an external network (e.g., PSTN), thereby to connect the call.

Figure 2:
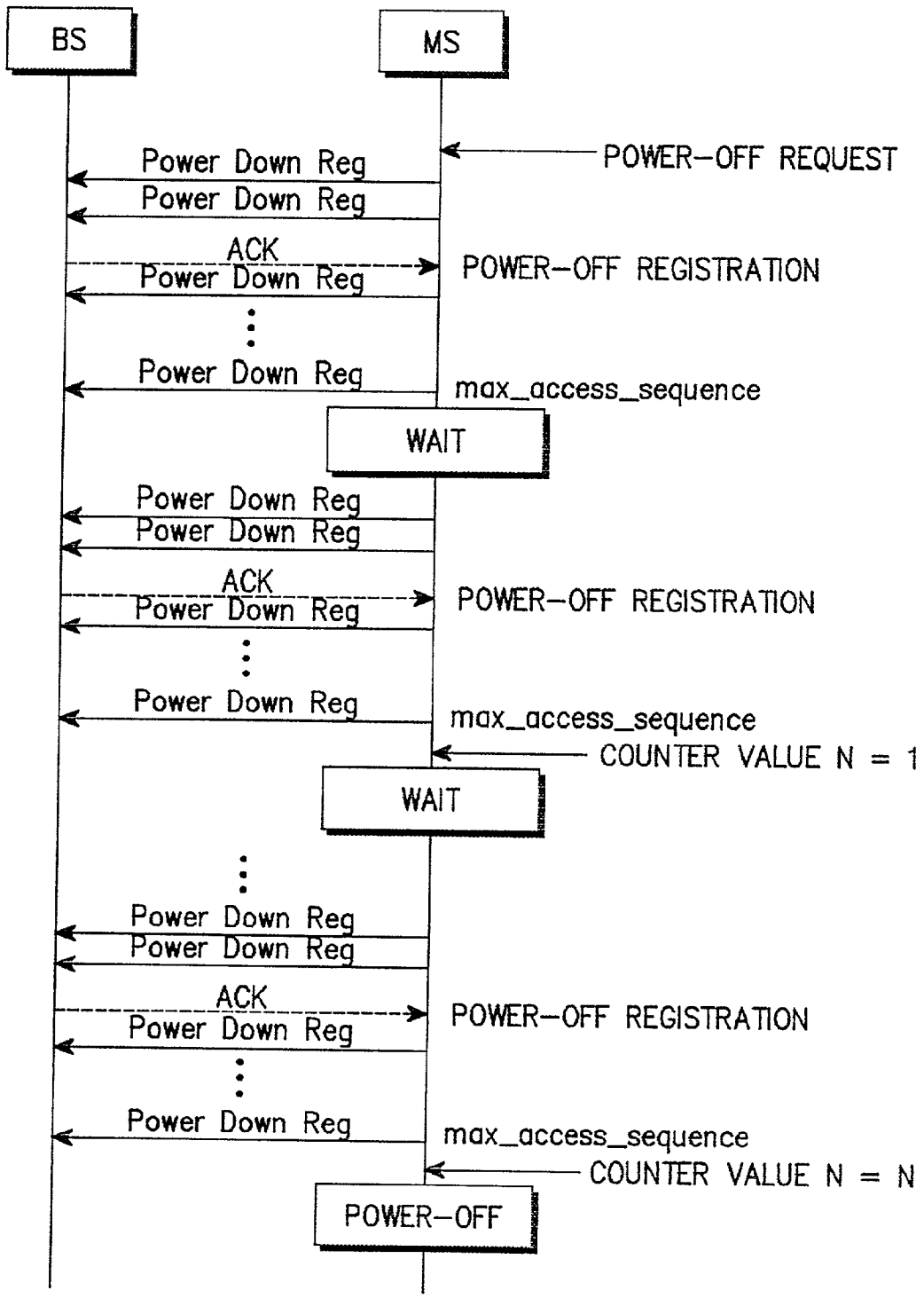
FIG. 2 is a diagram illustrating a BS-MS protocol chart for controlling power-off of a mobile station according to an embodiment of the present invention.
Figure 3:
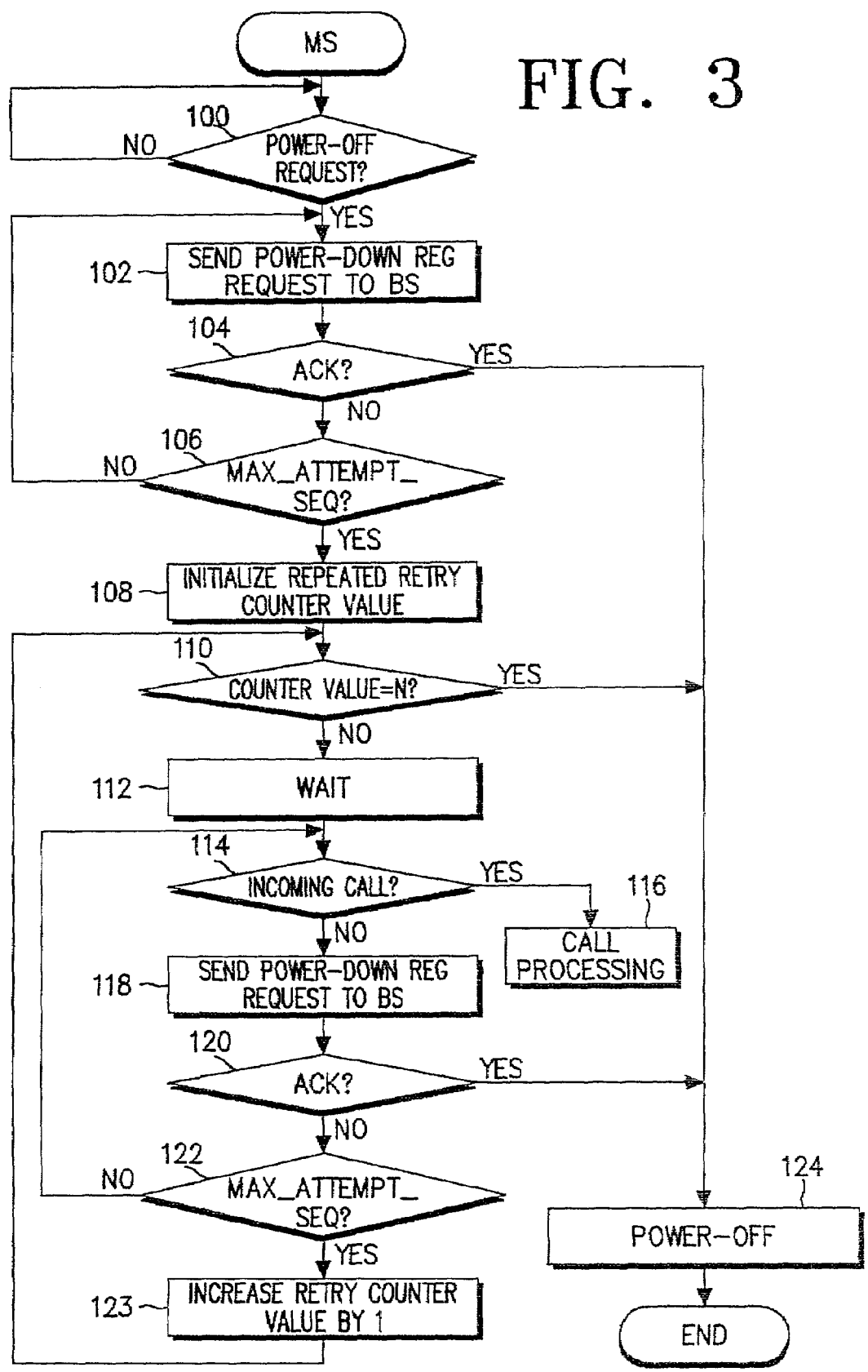
FIG. 3 is a flow chart illustrating a power-off control method for a mobile station according to an embodiment of the present invention.

FIG. 2 illustrates a BS-MS protocol chart for controlling power-off of the mobile terminal according to an embodiment of the present invention, and FIG. 3 illustrates a flow chart for controlling power-off of the mobile station according to an embodiment of the present invention.

In the embodiment of the present invention, in order to increase the success rate of power-down registration, upon failure to receive a response from the BS even after sending a power-down registration request to the BS as many times as the specified maximum attempt sequence, the MS repeatedly performs the power-down registration request process several times.

Now, an embodiment of the invention will be described in detail with reference to FIGS. 1 to 3.

When the MS user makes a power-off request using the power key mounted on the MS, the MS sends a power-down registration request to the BS as shown in FIG. 2. Upon receipt of a response ACK from the BS, the MS performs power-off. This process is performed in steps 100, 102, 104 and 124 of FIG. 3. This process will be described in more detail with reference to FIG. 3. Upon the user's power-off request, the MS proceeds from step 100 to step 102. In step 102, the MS sends a power-down registration request to the BS through the access channel. After that, the MS determines in step 104 whether a response ACK is received from the BS through the paging channel. Upon receipt of the response ACK, the MS performs power-off in step 124.

Otherwise, upon failure to receive the response ACK from the BS, the MS continuously attempts to send the power-down registration request as many times as a specified maximum attempt sequence (max_access_sequence) while increasing transmission power little by little. Upon receipt of the response ACK from the BS during the continuous attempts, the MS performs power-off. This process is performed in steps 104, 106, 102 and 124.

This process will be described in more detail with reference to FIG. 3. Upon failure to receive the response ACK from the BS in step 104, the MS determines in step 106 whether the power-down registration request has been attempted as many times as the specified maximum attempt sequence (max_probe_sequence or max_attempt_sequence). If the power-down registration request has not been attempted as many times as the specified maximum attempt sequence, the MS returns to step 102. Returning to step 102, the MS re-sends the power-down registration request to the BS at increased transmission power. Thereafter, the MS determines in step 104 whether the response ACK is received. Upon receipt of the response ACK in step 104, the MS performs power-off in step 124.

Upon failure to receive the response ACK from the BS even after continuously sending the power-down registration request as many times as the specified maximum attempt sequence (max_probe_sequence or max_attempt_sequence) while increasing the transmission power little by little, the MS repeatedly performs the power-down registration request process several times as shown in FIG. 2, rather than automatically performing MS power-off as in the prior art. This process is performed in steps 108 to 124 of FIG. 3. The operation in steps 180 to 124 of FIG. 3 can be regarded as a silent retry operation for the power-down registration request, since this operation is a power-down registration request operation that the MS user cannot recognize.

The operation in steps 108 to 124 of FIG. 3 will be described in more detail with reference to FIG. 3. If the power-down registration request has been attempted as many times as the specified maximum attempt sequence (max_probe_sequence or max_attempt_sequence) in step 106, the MS initializes a repeated retry counter value in step 108. Thereafter, the MS determines in step 110 whether the repeated retry counter value is equal to a predetermined number N (where N is an integer, e.g., 2 or 3). If the repeated retry counter value is smaller than the predetermined number N, the MS waits for a predetermined time (e.g., 1 or 2 seconds) in step 112. Thereafter, the MS determines in step 114 whether an incoming call is received. If no incoming call is received in step 114, the MS attempts to send the power-down registration request to the BS in step 118. However, upon receipt of an incoming call in step 114, the MS performs a call processing process in step 116. The intention of steps 114 to 116 is to process an incoming call, if the incoming call is received in the process of reattempting the power-down registration request as many times as the specified maximum attempt sequence.

After reattempting to send the power-down registration request to the BS in step 118, the MS determines in step 120 whether a response ACK is received. Upon receipt of the response ACK, the MS performs power-off in step 124.

However, upon failure to receive the response ACK in step 120, the MS determines in step 122 whether the power-down registration request has been reattempted as many times as the maximum attempt sequence. If the power-down registration request has not been reattempted as many times as the maximum attempt sequence, the MS retries the operation of steps 114 to 122. That is, the MS reattempts to send the power-down registration request as many times as the specified maximum attempt sequence (max_probe_sequence of max_attempt_sequence) while increasing transmission power little by little. Upon failure to receive the response ACK from the BS even after the reattempts as many times as the specified maximum attempt sequence, the MS increase the repeated retry counter value by 1 in step 123 and then returns to step 110 to re-perform the above-described operation.

In the process (steps 114 to 123) of repeatedly performing the power-down registration request operation, the MS performs power-off in step 124 upon receipt of the response ACK from the BS, and performs the call processing process in step 116 upon receipt of an incoming call from the BS, thus contributing to an increase in the success rate of power-down registration.

However, upon failure to receive the response ACK from the BS even though the reattempts of the power-down registration request process, i.e., the repeated retry counter value becomes equal to the predetermined number N, the MS performs power-off in step 124.

By increasing the success rate of power-down registration at the MS, it is possible to reduce the BS's load caused by the unnecessary paging attempts. In addition, it is also possible to prevent the user of the calling MS from waiting for a long time before receiving a voice mail service for the power-off state of the called MS.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A power control method for a mobile station in a mobile communication system, comprising the steps of:
    at a power-off request of a mobile station user, sending a power-down registration request from the mobile station to a base station as many times as a specified maximum attempt sequence until receipt of a response from the base station; and
    upon failure to receive the response from the base station even after the attempts to send the power-down registration request as many times as the specified maximum attempt sequence, resending the power-down registration request from the mobile station to the base station as many times as the specified maximum attempt sequence.

2. The power control method as claimed in claim 1, further comprising the step of performing a call processing process upon receipt of an incoming call during the resending step.

3. The power control method as claimed in claim 1, further comprising the step of powering off the mobile station upon one of the receipt of the response from the base station and resending the request for the specified maximum attempt sequence.

4. A power control method for a mobile terminal in a mobile communication system, comprising the steps of:
    at a power-off request of a mobile station user, sending a power-down registration request from the mobile station to a base station as many times as a specified maximum attempt sequence until receipt of a response from the base station;
    upon failure to receive the response from the base station even after sending the power-down registration request as many times as the specified maximum attempt sequence, resending the power-down registration request operation as many times as a predetermined retry number; and
    upon receipt of a response from the base station during the resending, performing power-off of the mobile station.

5. The power control method as claimed in claim 4, wherein the mobile station waits for a predetermined time before the mobile station resends the power-down registration request as many times as the maximum attempt sequence.

6. The power control method as claimed in claim 4, further comprising the step of performing a call processing process upon receipt of an incoming call during the resending step.

7. The power control method as claimed in claim 4, wherein the predetermined retry number is one of 2 and 3.

8. The power control method as claimed in claim 5, wherein the predetermined wait time is one of 1 and 2 seconds.

9. A power control method for a mobile terminal in a mobile communication system, comprising the steps of:
    at a power-off request of a mobile station user, sending a power-down registration request from the mobile station to a base station as many times as a specified maximum attempt sequence until receipt of a response from the base station;
    upon failure to receive the response from the base station even after sending the power-down registration request as many times as the specified maximum attempt sequence, resending the power-down registration request operation as many times as a predetermined retry number; and
    upon failure to receive the response from the base station after the resending for the predetermined retry number, performing power-off of the mobile station.

10. The power control method as claimed in claim 9, wherein the mobile station waits for a predetermined time before the mobile station resends the power-down registration request as many times as the maximum attempt sequence.

11. The power control method as claimed in claim 9, further comprising the step of performing a call processing process upon receipt of an incoming call during the resending step.

12. The power control method as claimed in claim 9, wherein the predetermined retry number is one of 2 and 3.

13. The power control method as claimed in claim 10, wherein the predetermined wait time is one of 1 and 2 seconds.

* * * * *